United States Patent
Wang et al.

(10) Patent No.: US 11,477,351 B2
(45) Date of Patent: Oct. 18, 2022

(54) IMAGE AND VIDEO BANDING ASSESSMENT

(71) Applicant: SSIMWAVE INC., Waterloo (CA)

(72) Inventors: Zhou Wang, Waterloo, MI (US); Hojatollah Yeganeh, Waterloo (CA); Ahmed Badr, Waterloo (CA); Kai Zeng, Kitchener (CA)

(73) Assignee: SSIMWAVE, Inc., Waterloo (CA)

( * ) Notice: Subject to any disclaimer, the term of this patent is extended or adjusted under 35 U.S.C. 154(b) by 0 days.

(21) Appl. No.: 17/225,808

(22) Filed: Apr. 8, 2021

(65) Prior Publication Data
US 2021/0321020 A1 Oct. 14, 2021

Related U.S. Application Data

(60) Provisional application No. 63/008,257, filed on Apr. 10, 2020.

(51) Int. Cl.
*H04N 5/21* (2006.01)
*H04N 9/64* (2006.01)
*H04N 7/015* (2006.01)

(52) U.S. Cl.
CPC ............. *H04N 5/21* (2013.01); *H04N 7/015* (2013.01); *H04N 9/646* (2013.01)

(58) Field of Classification Search
CPC .......... H04N 5/21; H04N 7/015; H04N 9/646; H04N 19/117; H04N 19/14; H04N 19/182; H04N 17/02; G06T 2207/10016; G06T 2207/20182; G06T 2207/30168; G06T 7/0004

USPC .......................................................... 348/615
See application file for complete search history.

(56) References Cited

U.S. PATENT DOCUMENTS

| | | | |
|---|---|---|---|
| 2003/0108237 A1* | 6/2003 | Hirata | G06T 7/187 382/164 |
| 2006/0269159 A1* | 11/2006 | Kim | G06T 5/20 382/256 |
| 2009/0103898 A1* | 4/2009 | Morioka | G11B 27/28 386/326 |
| 2010/0066912 A1* | 3/2010 | Kumwilaisak | H04N 19/17 375/E7.076 |
| 2010/0260271 A1 | 10/2010 | Kapoor | |
| 2011/0129020 A1* | 6/2011 | Li | H04N 19/115 375/E7.19 |
| 2013/0235942 A1 | 9/2013 | Su et al. | |
| 2016/0307302 A1* | 10/2016 | Chou | G06T 5/002 |
| 2016/0366422 A1* | 12/2016 | Yin | H04L 43/16 |
| 2017/0195654 A1* | 7/2017 | Powers | H04N 5/2256 |
| 2017/0347126 A1* | 11/2017 | Shoa Hassani Lashdan | H04N 19/182 |
| 2018/0352264 A1* | 12/2018 | Guo | H04N 19/117 |

(Continued)

*Primary Examiner* — Michael Lee
(74) *Attorney, Agent, or Firm* — Brooks Kushman P.C.

(57) ABSTRACT

Banding effects in an image or video are assessed. The image or each frame of a video is decomposed into luminance or color channels. Signal activity is computed at each spatial location in each channel. A significance of the signal activity at each spatial location is determined by comparing each element of the signal activity with a significance threshold. Banding pixels are detected as those pixels of the image or frame having significant signal activity at their respective spatial locations and having non-significant signal activity of at least a minimum threshold percentage of neighboring pixels to the respective spatial locations.

28 Claims, 9 Drawing Sheets

(56) References Cited

U.S. PATENT DOCUMENTS

2019/0080437 A1* 3/2019 Shivakumar .............. G06T 7/11
2020/0077122 A1* 3/2020 Alakuijala ............. H04N 19/44

* cited by examiner

IMAGE AND VIDEO BANDING ASSESSMENT

CROSS-REFERENCE TO RELATED APPLICATIONS

This application claims the benefit of U.S. provisional application Ser. No. 63/008,257 filed Apr. 10, 2020, the disclosure of which is hereby incorporated in its entirety by reference herein.

TECHNICAL FIELD

Aspects of the disclosure generally relate to automated detection and assessment of visual banding effect in digital images and video signals.

BACKGROUND

Banding is a common visual effect when a digital image or video is presented on a display device. Banding occurs most frequently in large smooth regions of low texture and slow luminance and/or color gradients in an image or video frame, where large smooth and nearly flat regions are visually divided by long contours into discrete bands.

SUMMARY

In one or more illustrative examples, a method for assessing banding effects in an image or video includes decomposing the image or each frame of the video into luminance or color channels; computing signal activity at each spatial location in each channel; determining a significance of the signal activity at each spatial location by comparing each element of the signal activity with a significance threshold; and detecting banding pixels as those pixels of the image or frame having significant signal activity at their respective spatial locations and having non-significant signal activity of at least a minimum threshold percentage of neighboring pixels to the respective spatial locations.

In one or more illustrative examples, a system for assessing banding effect in an image or video includes a computing device programmed to decompose the image or each frame of the video into luminance or color channels; compute signal activity at each spatial location in each channel; determine a significance of the signal activity at each spatial location by comparing each element of the signal activity with a significance threshold; and detect banding pixels as those pixels of the image or frame having significant signal activity at their respective spatial locations and having non-significant signal activity of at least a minimum threshold percentage of neighboring pixels to the respective spatial locations.

DETAILED DESCRIPTION

Figure 1:
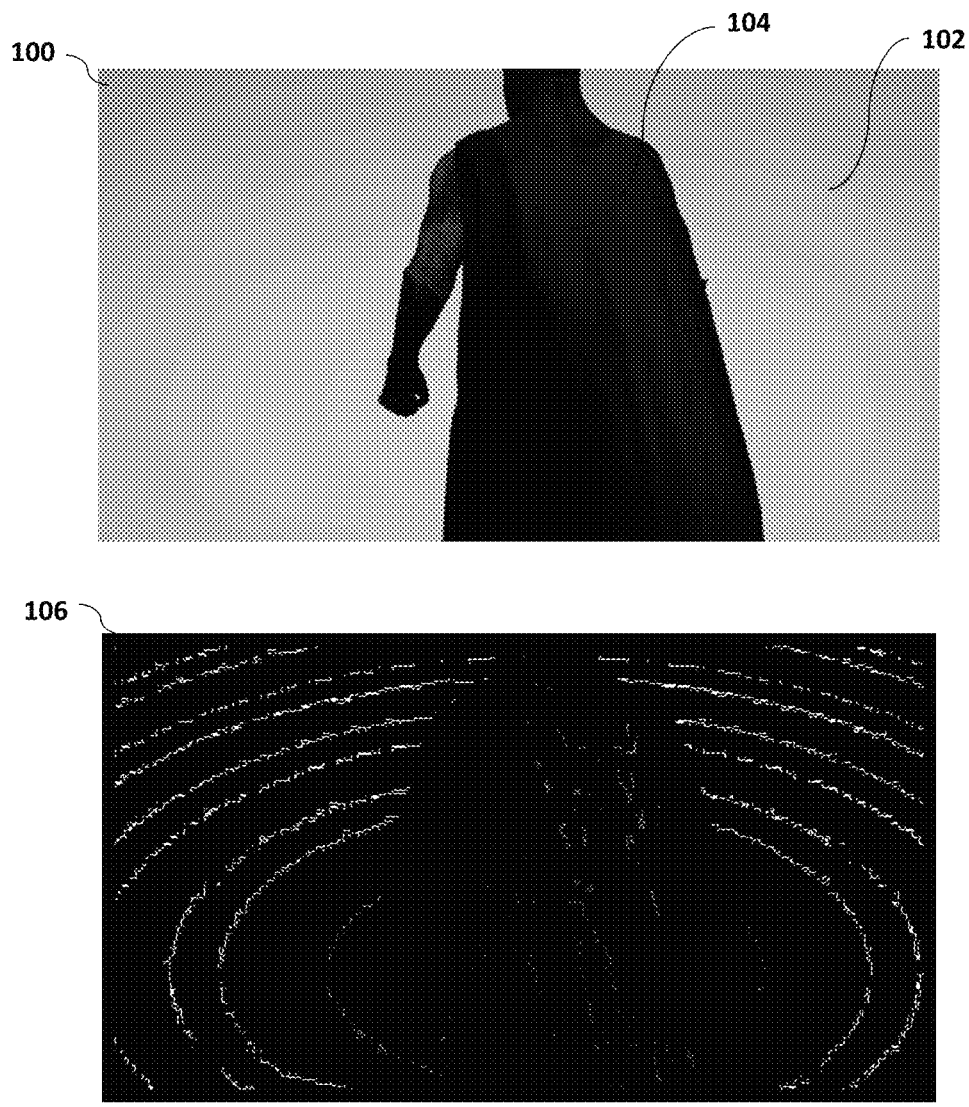
FIG. 1 illustrates a sample video frame with banding artifacts (top), and a banding map (bottom) created by an embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the disclosure generally relate to automated detection and assessment of visual banding effect in digital images and video signals. This may be performed by measuring signal activity at each spatial location, and then finding banding pixels as pixels of significant activity at their locations in the image or video frame, where at least a minimum threshold percentage (e.g., 50% or higher percentage) of their neighboring pixels have non-significant signal activity. The signal activity is computed as local signal energy, and its significance is determined by a significance threshold. The significance threshold is computed and adjusted by several factors, including (1) human visual system (HVS) just noticeable difference (JND) levels; (2) the maximum and minimum luminance levels of the display device; (3) the bit-depth of the standard dynamic range (SDR) or high dynamic range (HDR) image or video content; (4) the maximum, minimum, and mean luminance values of the image or video content, and the values contained in the metadata in the SDR or HDR image or video format; (5) the optical-electro transfer function (OETF) and electro-optical transfer function (EOTF) in the acquisition and display of the image and video content; (6) the pixel color value, the color space, color downsampling format, and color gamut of the image or video representation; and (7) the viewing distance, viewing angle, and the ambient light level of the viewing environment. The detected banding pixels may also be reduced by comparing the signal activity with a high activity threshold, and removing the banding pixels that have higher signal activity than the high activity threshold.

Another aspect of the present disclosure relates to creating a banding map that indicates where in an image or video frame that banding occurs, and how strong the banding effect is. Yet another aspect of the present disclosure relates to creating a banding spread measure and a banding strength measure for an image or a video frame that indicates how much the banding effect spreads and how strong the banding effect is in the regions that are detected to have banding. The banding spread and banding strength measures may be computed for each color channel of an image or video frame, and then be combined to an overall banding level or banding presence measure for the image or video frame. Yet another aspect of the present disclosure relates to banding measurement of a video, where the per-frame banding spread, per-frame banding strength and per-frame banding level (or banding presence) measures are aggregated over a time scale. Depending on the definition of the time scale, the banding effect may be reported for specific time-scale levels, for example, per group-of-picture (per-GoP), per-scene, per video asset, per-second, per-minute, per-hour, and any other time scales. Yet another aspect of the present disclosure is its applicability to apply banding detection in both single-ended no-reference assessment and double-ended full-reference assessment scenarios.

The present disclosure applies to both apply to standard dynamic range (SDR) and high dynamic range (HDR) images and videos, images or videos of any bit-depth, any color format, any color gamut, any color downsampling or YCC format, any OETF/EOTF for cameras and displays, and in the case of HDR, any HDR standards including HLD, HDR10, HDR10+, and Dolby Vision. These techniques may be used for both quality control and quality optimization purposes.

FIG. 1 illustrates an example of a video frame with banding artifacts 100 (top), and a banding map 106 (bottom) created by an embodiment of the present disclosure. As discussed herein, an image generally refers to a set of pixel elements. Each pixel may be a sample of an original image, and may be associated with one or more component intensities such as red, green, and blue, or cyan, magenta, yellow, and black. The amount of pixels in each frame is typically referred to as a frame size or image resolution, which relates to the pixel dimensions of the image. A video stream is a sequence of multiple such images. The images of a video stream are often referred to as frames. The techniques for computing banding pixels and banding maps described herein operate on images, either as standalone images or as frames of video.

In the cases that the original image/video content does not contain any banding, when it undergoes certain operations such as bit-depth quantization or tone mapping, color format conversion or gamut mapping, luma or color downsampling/ upsampling, lossy image/video compression, certain image/ video enhancement/denoising/deblocking filtering operations, and certain combinations of the aforementioned operations, the images or video frames become more inclined to banding. Whether the banding effect is visible and how strong the visual effect depend on the display device, the setup of the display device (maximum and minimum luminance, viewing mode, color format configurations, color gamut setting, bit-depth setting, optical-electro and electro-optical transfer functions, and on-device operations, etc.), and the viewing condition (viewing distance and angle, ambient lighting level, etc.).

For example, in FIG. 1, banding exists in both the background region 102 and the foreground region 104 showing human body/clothes. Notably, the banding may be much more visible in the background region 102 than in the foreground region 104, depending on the viewing display device, the settings of the device, and the viewing conditions. Banding effect may strongly impact the perceived quality of the image/video, and thus it is highly desirable to detect, assess and reduce/remove banding effect for standard dynamic range (SDR) and high dynamic range (HDR) images/videos, especially when they are working at high quality ranges.

The detection and assessment of the banding effect may be determined from an image or video clip at the pixel level. Although block-based image/video compression is a common source that causes banding, many other aforementioned operations and mixed operations may also create banding. As a result, the banding pixels may or may not be located exactly at the boundaries of block processing or block transform units defined by block-based image/video compression encoders. The banding effect may be detected and assessed in both SDR and HDR images/videos, regardless of the cause of the banding, and the assessment results depend on the image/video content, the viewing display device, the setup of the display device, and the viewing condition. As explained in further detail herein, an important aspect of the analysis including accounting for human visual system (HVS) features and the interaction of such features with display device properties and setups in banding assessment.

Figure 2:
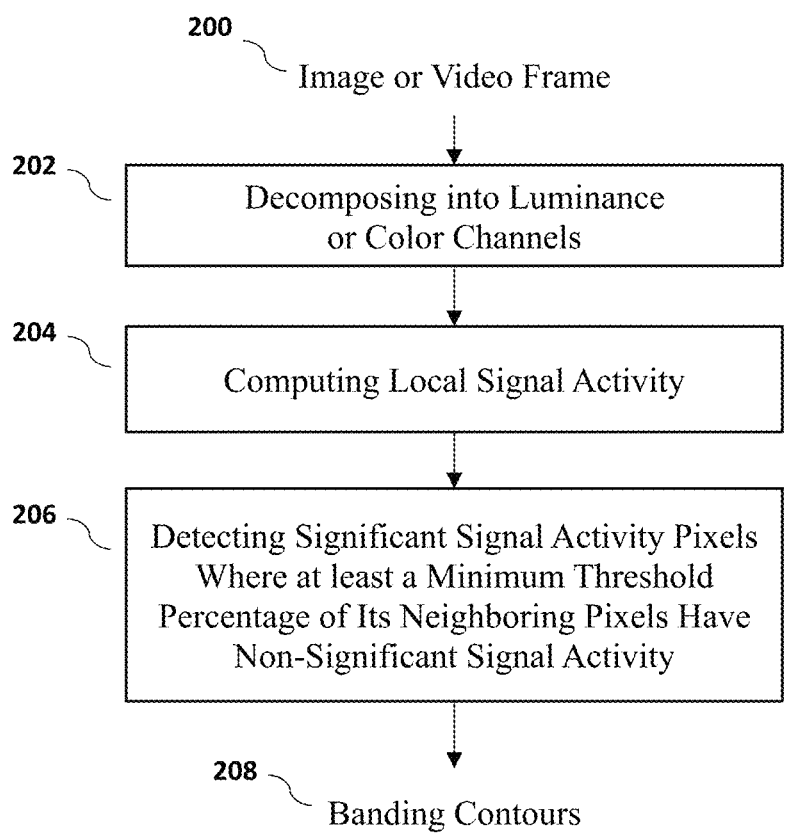
FIG. 2 illustrates an example method for detecting banding pixels in an image or video frame.

FIG. 2 illustrates an example method for detecting banding pixels in an image or video frame. In an example, the video frame may be a frame of a video stream of a video distribution system that is being monitored for quality. In another example, the image may be a still frame.

At operation 202, the image or each video frame are decomposed into luminance or color channels. In the example of a grayscale image, there may be only a single channel. However, in many examples, these channels may include one or more of RGB, HSV and YCbCr decompositions of the image.

At operation 204, the signal activity is measured at each spatial location. In an example, these spatial locations may include all of the pixels of the image. In another example, these spatial locations may be a subset of the pixels of the image, such as every other pixel. The computation of these local signal activity measurements are useful for banding pixel detection. An example implementation of these aspects is described in detail with respect to FIG. 3.

At operation 206, banding pixels 208 are determined. Banding pixels 208 may be determined as being any pixels in the image or video frame that 1) have significant signal activity at their locations as defined herein; and 2) where at least a minimum threshold percentage of their neighboring pixels have non-significant signal activity. The minimum threshold percentage may be defined as a threshold that may be determined empirically for a compromise between false positives and false negatives. A larger threshold leads to a stricter criterion for detecting banding, and may result in fewer banding pixels being detected. For instance, thresholds such as 20%, 30%, 40%, 50%, 60%, 70%, 80%, 90%, 99% or another in-between value may be used. The neighboring pixels may be defined as those pixels within a surrounding local window of square, circular, rectangular, or other shapes. The size of the local window may be chosen for a compromise between accuracy, localization, and computational speed/cost. For example, a square window of size N×N may be chosen, where N may be 3, 5, 7, 11, 21, 51, or another integer number. Although the detected banding pixels may not always connect to form continuous contours, these pixels are typically aligned along long contours in an image or video frame. An example banding map 106 illustrating such contours is shown in FIG. 1. Contour tracing methods applied after the banding pixels are detected may be used to refine the connections and shapes of banding contours for better appearance, and may be an optional further processing for the purposes of banding detection and banding level assessment. The collection of detected banding pixels 208 may subsequently be processed by further operations to generate various measures (such as per-color channel or per-frame banding spread, banding strength, banding map, and areas/regions of banding) about the banding effect, and may also be aggregated to banding effect measurements at each spatial location (in an image or video frame), each time instance (frame) in a video, and at larger time scales (per-scene, per-second, per-minute, per-hour, and so on).

Figure 3:
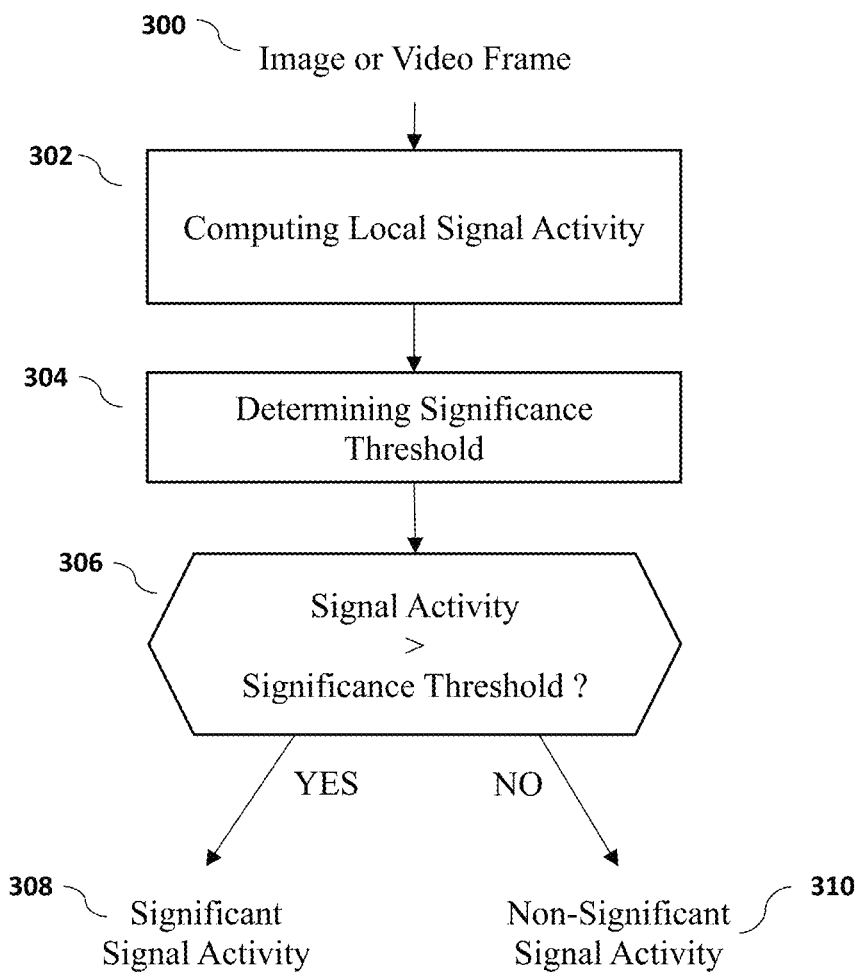
FIG. 3 illustrates an example method for computing local signal activity and determining significant and non-significant signal activity.

FIG. 3 illustrates an example method for computing local signal activity and determining significant and non-significant signal activity. A image or video frame is given at operation 300. In an example, this may be the image being analyzed for banding pixels as described in FIG. 2.

At operation 302, the local signal activity for the image is computed in every spatial location in the image or video frame. There are many approaches that may be used to compute local signal activity. As one possibility, a local window surrounding a local point or region is first defined, which may be in square, circular, rectangular, diamond or other shapes, and may also be a smooth window such as 2D Gaussian, Raised Cosine, Bartlett, Blackman, Hamming, Hanning, Kaiser window or of other shapes. The size of the local window may be defined empirically, and may consider jointly for a compromise between accuracy, localization, and computational speed/cost. For example, the smallest window can be as small as 1×2 or 2×1 pixels for the maximum speed and localization, and for another example, it may be as large as 100×100 pixels or larger for better approximation of the desired shapes (e.g., Gaussian, Hamming, etc.). Statistical features for activity or energy estimation is then computed within the window. Examples of such features include the standard deviation (std), the zero-crossing rate, the $l_p$ norm, the power, the second or higher-order moments, or the std, power or energy of linear and non-linear filter responses of the signal computed within the local window.

At operation 304, a significance threshold on the scale of the signal activity measure is determined. This significance threshold may be used to determine whether the local signal activity values computed at operation 302 are significant or non-significant. Aspects of determination of the significance threshold are described in detail with respect to FIG. 4.

At operation 306, the significance threshold is compared with the local signal activity measure. Responsive to the signal activity being larger than the significance threshold, the signal activity is determined to have significant signal activity at operation 308; otherwise, the signal activity is determined to have non-significant signal activity at operation 310. According to this approach, every spatial location in the image or video frame is marked to have either significant signal activity or non-significant signal activity.

Figure 4:
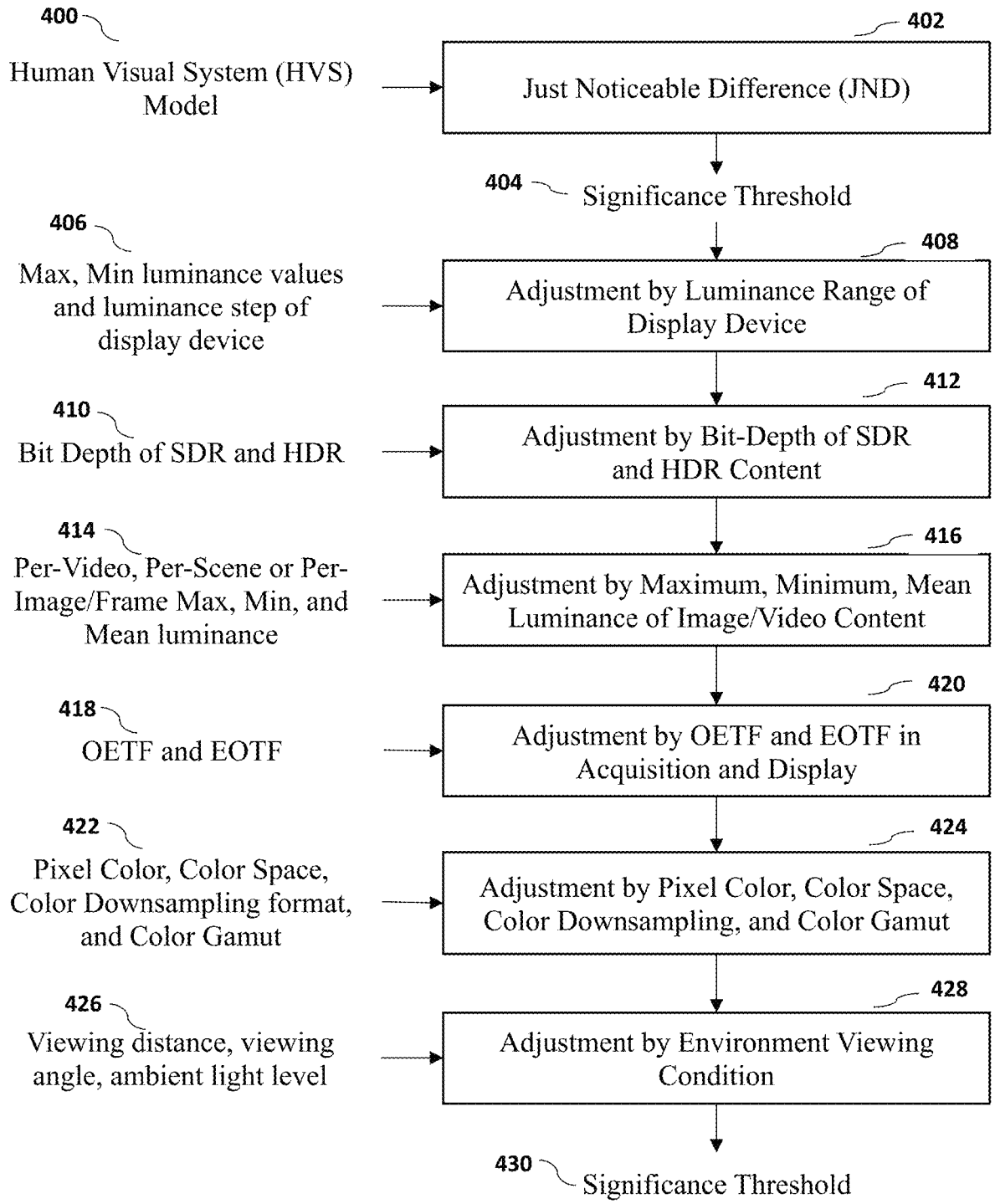
FIG. 4 illustrates an example method for determining significance threshold of signal activity.

FIG. 4 illustrates an example method for determining significance threshold of signal activity. The significance threshold for signal activity may be adjusted based on various factors, such as the human visual system (HVS), the display device, the signal dynamic range, the value range of image or video content, the optical-electro transfer function (OETF) and electro-optical transfer function (EOTF) used in the acquisition and display processes, the pixel color value, color space, color downsampling format, the color gamut, and the viewing condition and viewing environment. The setting of this significance threshold and its adjustment may allow for a better analysis of whether banding would actually be perceptible to the user.

A HVS model 400 is used at operation 402 to determine a value of just noticeable difference (JND). The HVS model 400 may be used by image processing, video processing, and computer vision experts to deal with biological and psychological processes. One example of an aspect of the HVS model 400 is that color resolution may be perceived at a lower level by users than the brightness resolution. Another aspect of the HVS model 400 is the level of difference required for a user to see a difference. JND relates to the perceptual concept of the amount that a quantity must be changed in order for a difference to be noticeably detectable by an observer all of the time (or in other examples at least half of the time). The JND may sometimes be related as a constant that is equal to the ratio of the addition of intensity required for an input to be perceived to the original intensity. The HVS model 400 may be used to determine the just discerned signal difference by the visual system and may be affected by a number of HVS features such as the contrast sensitivity function, and the luminance, contrast and texture masking effects. In some examples, the JND may be set in part empirically based on an evaluation of user perception. The JND may be used to determine the baseline significance threshold 404 on the scale of signal activity. The baseline significance threshold 404 may, in an example, be directly equal to one JND, and may also be a function of the JND, for example, the JND multiplied by a scale factor, or a monotonically increasing nonlinear mapping from the JND.

As another aspect, the maximum and minimum luminance levels 406 of the display device may be used to determine the luminance range of the display device and subsequently adjust the significance threshold at operation 408. This information may be received from the display device in an example, or may be retrieved from storage including information regarding the capabilities of various display devices. In an example, when the display luminance range is higher, the average luminance difference between consecutive image intensity values is larger, and thus the difference is more easily discerned. Therefore, the significance threshold should be adjusted lower. For example, when the display luminance range becomes higher by a scale factor k, where (k>1), the significance threshold may be scaled inversely proportionally by a factor (1/k).

The bit-depth of the standard dynamic range (SDR) or high dynamic range (HDR) image or video content 410 may also be used to adjust the significance threshold at operation 412. This adjustment may be based on the fact that higher dynamic range representation of the luminance value allows for the difference in luminance levels between two consecutive signal intensity values to be smaller, and thus the significance threshold value defined on the signal intensity scale should be higher.

Per-video, per-scene or per image/frame maximum, minimum, and mean luminance values of the image or video content 414 may be used to adjust the significance threshold at operation 416. Such information is often available in state-of-the-art HDR standards (such as HDR10, HDR10+, and Dolby Vision) in the form of metadata attached to in the SDR or HDR images or video streams. These standards often suggest additional luminance mappings of the image or video content, thus change the difference in luminance levels between two consecutive signal intensity values, and therefore the significance threshold may be adjusted accordingly. For example, when the luminance range (between the minimum and maximum luminance) of a video/scene/frame is changed according to one of the HDR standards by a scale factor, then the significance threshold may be changed proportionally by the same scale factor.

The OETF and EOTF in the acquisition and display of the image and video content 418 may be used to adjust the significance threshold at operation 420. The OETF/EOTF are typically nonlinear curves (e.g., different Gamma curves, HLG curve, and PQ curve) for luminance mapping, leading to changes in the luminance level differences between two consecutive signal intensity values, and such changes depend on the actual luminance value. Therefore, the significance threshold may be adjusted accordingly. For example, when at a certain luminance level, the luminance difference between two consecutive signal intensity values is changed due to OETF or EOTF mapping by a scape factor, then the significance threshold at that luminance level may be changed proportionally by the same scaling factor.

The pixel color value, the color space, color downsampling format, and color gamut of the image or video representation 422 may be used to adjust the significance threshold at operation 424. The existing color spaces (for example, linear RGB, PQ-encoded RGB, XYZ, HSV, YCbCr, among many others) are not perceptually uniform. As a result, depending on the specific color of the image pixel, the visibility difference is different. As practical image and video transmissions often involve color space conversion, color gamut mapping, and downsampling in color components (for example, different YCC color formats), the color level differences between two consecutive signal intensity values in that color channel go through many linear and non-linear mapping processes, and the significance threshold should be adjusted accordingly (for example, proportional to the mappings).

The viewing condition, including the viewing distance, viewing angle, and the ambient light level of the viewing environment 426 may be used to adjust the significance threshold at operation 428. The visual sensitivity of signal differences change largely with the viewing condition. For example, the shadow details in a scene is much less visible if the ambient light level is high. Therefore, the significance threshold may be adjusted according to such visual sensitivity (for example, proportionally).

Accordingly, the significance threshold value 430 defined on the scale of signal activity, and computed and adjusted based on all the aforementioned factors, may be applied to judge whether at each spatial location of an image or video frame the local signal activity is significant.

Figure 5:
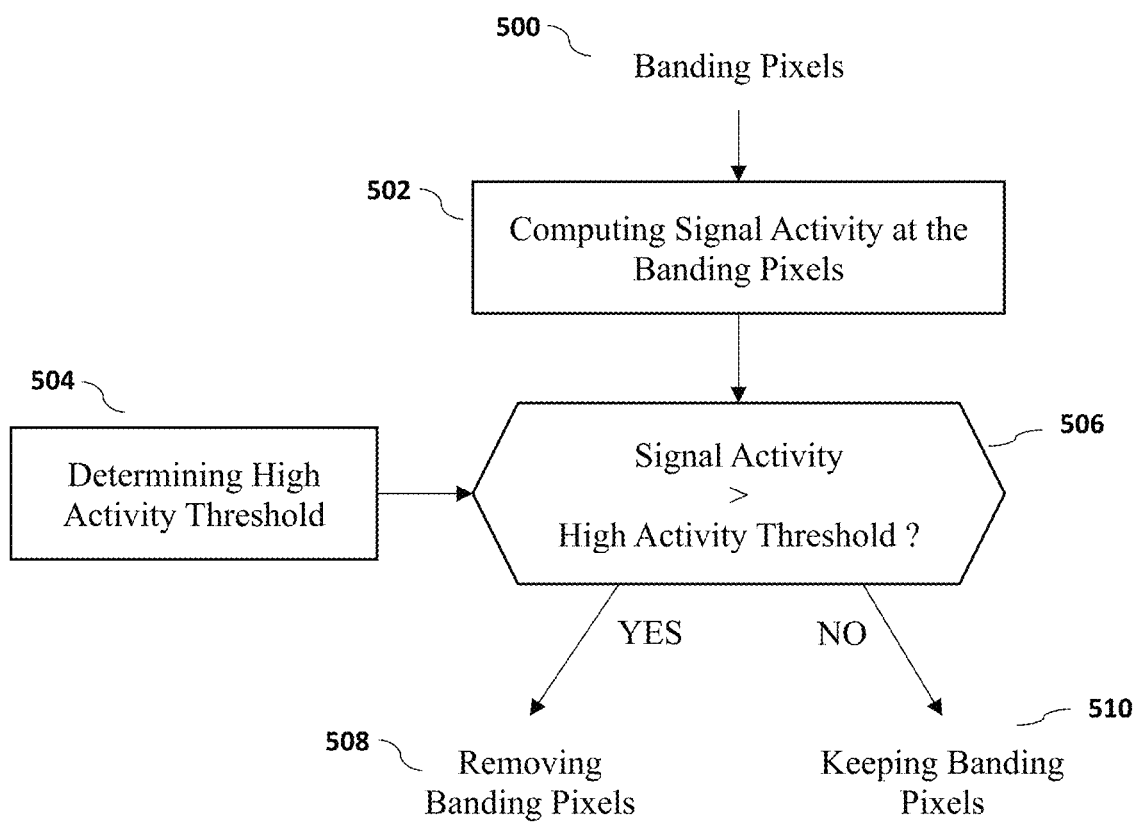
FIG. 5 illustrates an example method for adjusting the detection result of banding pixels by removing those pixels of high signal activity.

FIG. 5 illustrates an example method for adjusting the detection result of banding pixels by removing those pixels of high signal activity. The collection of detected banding pixels may be refined (or trimmed) by removing pixels of high signal activity. Here the term "high signal activity" should not be confused with the term "significant signal activity" mentioned earlier. A local signal may be significant in activity but is far below the threshold of high signal activity. One reason for trimming the collection of banding pixels this way is that "high signal activity" is most likely caused by the original source image or video content rather than banding, and therefore only those pixels that have lower than a high activity threshold may be classified as banding artifacts (or defects). The high signal activity threshold may be set empirically.

More specifically, the detected banding pixels 500 are measured for their signal activity at operation 502. The high activity threshold is determined at operation 504 for a value, above which the high signal strength (signal activity) is most likely caused by the source image or video content. Therefore, the signal activity computed at the pixel location is compared with the high activity threshold at operation 506. If the signal activity is higher, than the pixel location is removed from the collection of detected banding pixels 508; otherwise, the pixel location remains being a banding pixel 510. Accordingly, this process may largely reduce the false positives in banding detection.

Figure 6:
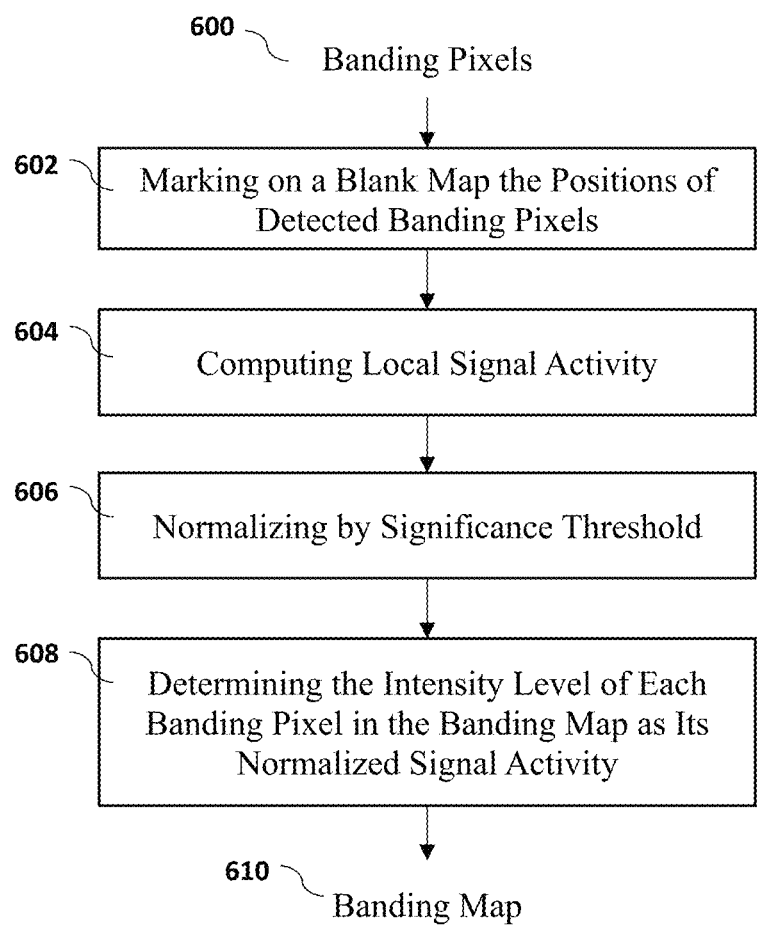
FIG. 6 illustrates an example method for generating banding maps.

FIG. 6 illustrates an example method for generating banding maps. The banding map may be created for an image or video frame from the detected banding pixels. Specifically, starting from a blank map of the same size of an image or video frame, the positions of the detected banding pixels 600 in the image or video frame are marked on the blank map at operation 602. This process results in a binary map of the same size as the image or video frame being assessed, where the positions of detected banding pixels are marked as a first value (e.g., 1, true, etc.), and the rest of the map is marked as a second value (e.g., 0, false, etc.). The local signal activity of the image or video frame at the banding pixels are then computed at operation 604. The signal activity is then normalized based on the significance threshold at operation 606, resulting in a normalized signal activity. In an example, the normalization may be performed by dividing the signal activity by the significance threshold. It may also be done by other variations, for example, by dividing signal activity by a value formed by the significance threshold plus a constant, or by raising the result of the visions to a power greater than zero. The intensity value at the banding pixels in the map (marked as the first value) may then be replaced by the normalized signal activity measure at the pixels at operation 608. This leads to the banding map 610, where the region of the image with no banding detected remains at the second value, but at the banding pixels the intensity values are equal to the local normalized signal activity measurement. This banding map reveals how much the banding effect is visible at each spatial location in an image or video frame. An example banding map is shown at the bottom of FIG. 1 at 106, where brighter in the map indicates higher banding visibility.

Figure 7:
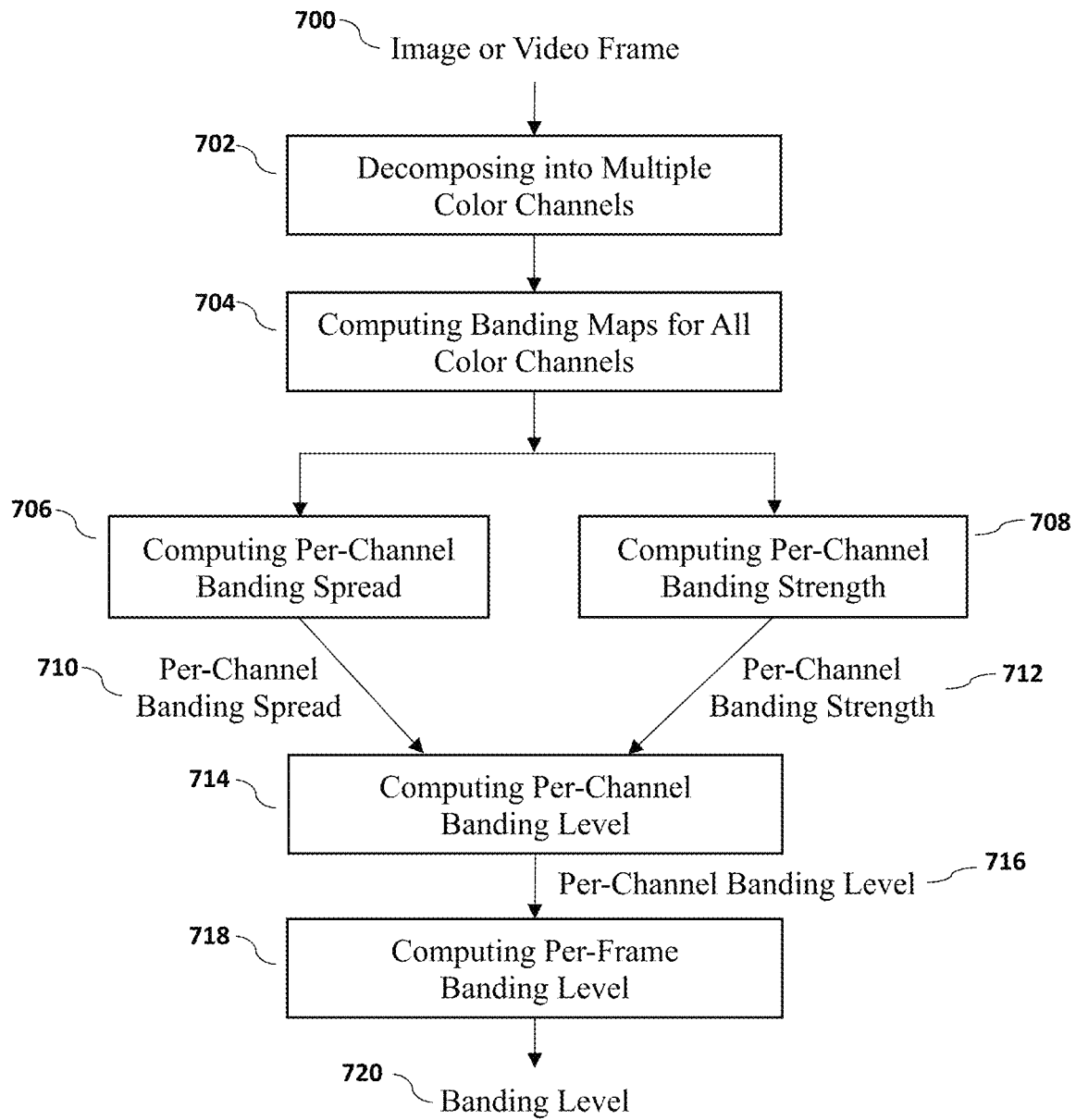
FIG. 7 illustrates an example method for computing banding spread, banding strength, and banding level in an image or video frame.

FIG. 7 illustrates an example method for computing banding spread, banding strength, and banding level in an image or video frame. The detected banding pixels at each image or video frame may be aggregated to several banding assessment measurement, including per-channel and per-frame banding spread, banding strength, and banding level measures.

As shown, an image or video frame under testing 700 is first decomposed into multiple luminance and color channels at operation 702. Note that in the case that one of the color channels represent the luminance, that channel is also counted as a color channel. The decomposition may be performed for one type of color space, e.g., RGB, but may also be conducted for multiple color spaces, for example, the RGB, HSV and YCbCr decompositions. In the latter case, the number of the resulting color channels also expands accordingly, for example, in the case of both RGB and YCbCr decompositions, the resulting number of color channels is six: R, G, B, Y, Cb, and Cr, respectively.

The banding maps are then computed for all color channels at operation 704. Based on the banding map of a color channel, a per-channel banding spread is computed at operation 706, for example, by computing the percentage of areas in the image or video frame that contain banding pixels. Also based on the banding map, a per-channel banding strength is computed 708, for example, by averaging the signal activities at all banding pixels.

The resulting per-channel banding spread 710 and per-channel banding strength 712, are then combined to an overall banding level measure of the channel at operation 714. The combination may be performed by computing their sum, average, product, weighted-average, median, maximum, minimum, or other methods. The per-channel banding level 716 for different channels may be similar but may also be very different from each other. For example, banding may occur in one or two of the color channels, but be absent from the other color channels.

The per-channel banding level measures are combined into a single per-frame banding level measure at operation 718. The combination may be conducted by computing the sum, average, product, weighted-average, median, maximum, or minimum of per-channel banding level measures. The resulting banding level measure 720 is a scalar banding assessment result for the image or video frame.

Other embodiments of the present disclosure that deviate from the exact diagram of FIG. 7 is also possible. For example, one may combine per-channel banding spread measures to a per-frame banding spread measure, or combine per-channel banding strength measures to a per-frame banding strength measure, using the same approach as in at operation 714.

It should be noted that when assessing the banding effect of a video, the per-frame banding spread, per-frame banding strength, and per-frame banding level measures may be aggregated along the time dimension at different time scales. The time scale is flexible, for example, it may be per group-of-picture (GoP), per-scene, per video asset, per-second, per-minute, per-hour, or any other time scale. The aggregation process may use different methods, for example, by computing the sum, average, weighted-average, median, percentile, maximum, or minimum of per-frame banding spread, banding strength, and banding level measures.

The banding assessment methods specified above are in essence no-reference (NR) methods, meaning that when assessing a test image or video, access to the original (often perfect-quality) reference image or video is not available. In yet another aspect of the present disclosure, banding assessment may be performed in a full-reference (FR) manner, meaning that when assessing a test image or video, full access to the original perfect-quality reference image or video is available.

Figure 8:
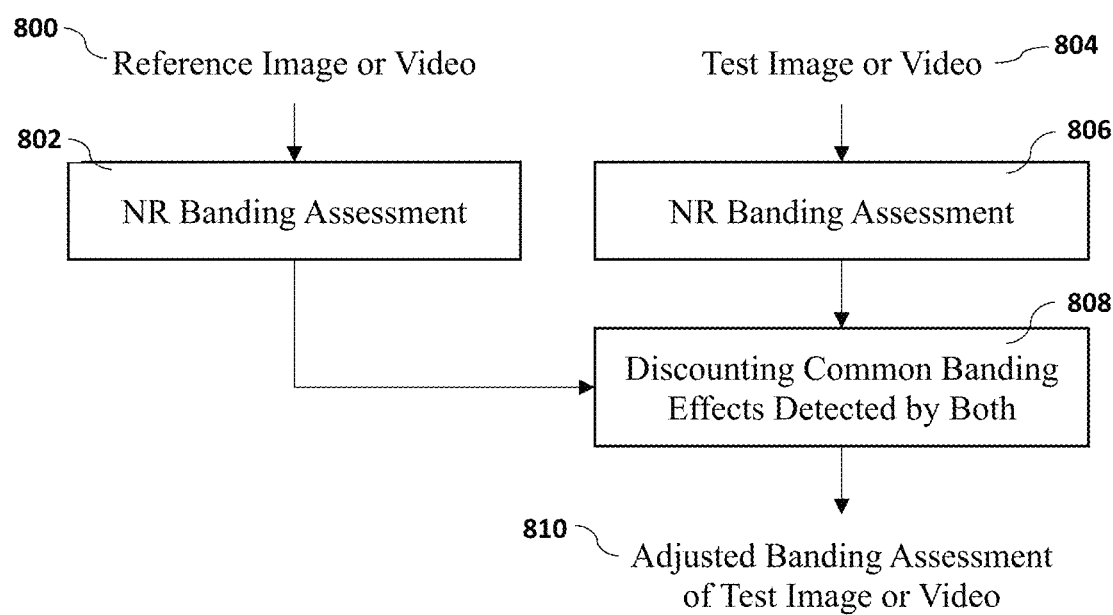
FIG. 8 illustrates an example method for adjusting banding assessment of a test image or video using the banding assessment of a reference image or video.
Figure 9:
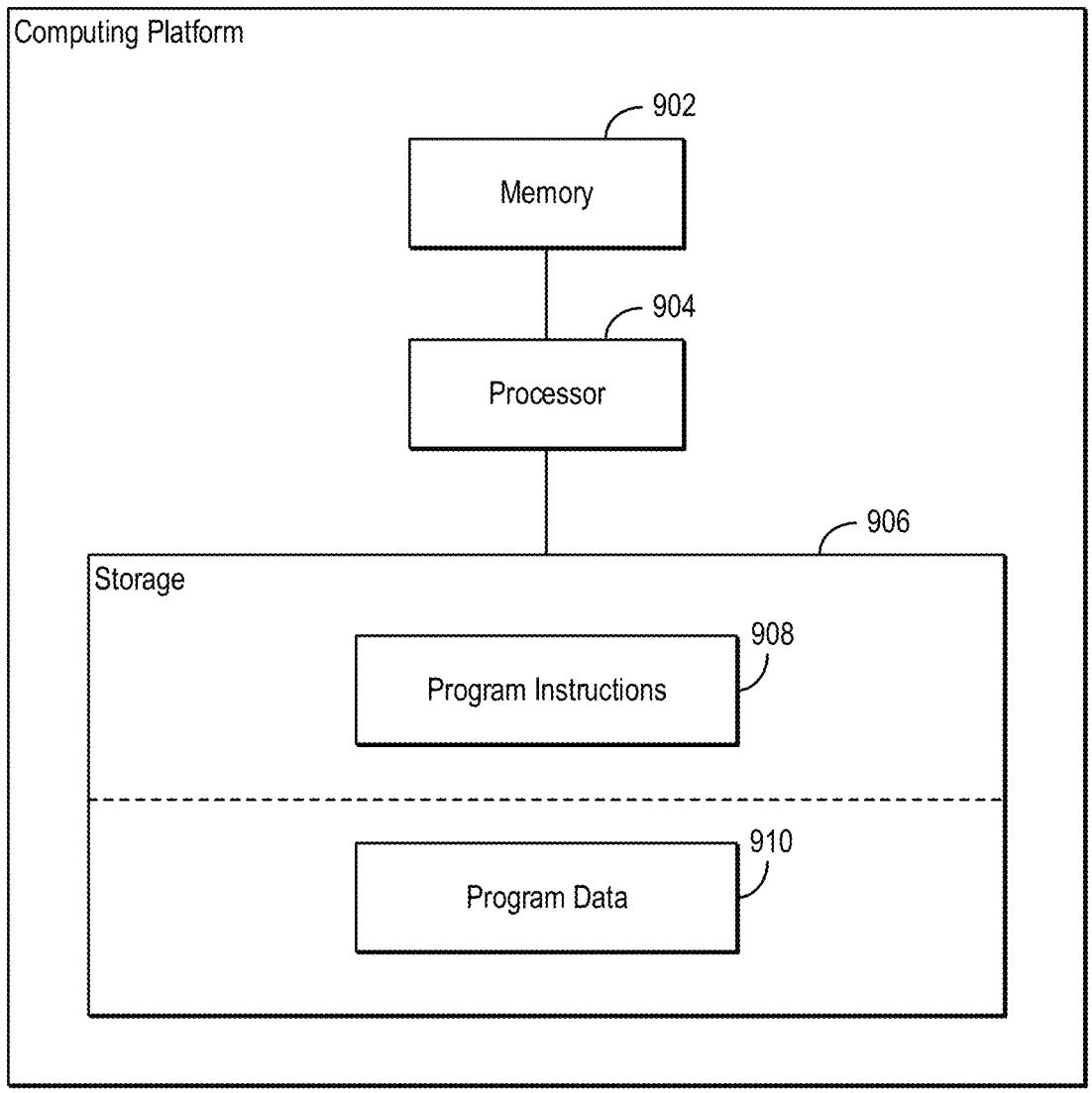
FIG. 9 illustrates an example computing device for performing automated detection and assessment of visual banding effect in digital images and video signals.

FIG. 8 illustrates an example method for adjusting banding assessment of a test image or video using the banding assessment of a reference image or video. First, the reference image or video 800 is treated as a testing image or video for NR banding assessment 802. Second, the test image or video 804 also go through the NR banding assessment 806. The two banding assessment results are then compared and the common banding effects detected by both are discounted (removed) from the banding assessment results of the test image or video 808. The result is an adjusted banding assessment of the test image or video 810. A rationale behind this discounting operation is that the original reference image or video is of perfect quality, and thus the banding effect detected there is considered the creative intent of the image or video content and should not be treated as quality degradation FIG. 9 illustrates an example computing device 900 for performing automated detection and assessment of visual banding effect in digital images and video signals. The algorithms and/or methodologies of one or more embodiments discussed herein, such as those illustrated with respect to FIGS. 2-8, may be implemented using such a computing device 900. The computing device 900 may include memory 902, processor 904, and non-volatile storage 906. The processor 904 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 902. The memory 902 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 906 may include one or more persistent data storage devices such as a hard drive, optical drive, tape drive, non-volatile solid-state device, cloud storage or any other device capable of persistently storing information.

The processor 904 may be configured to read into memory 902 and execute computer-executable instructions residing in program instructions 908 of the non-volatile storage 906 and embodying algorithms and/or methodologies of one or more embodiments. The program instructions 908 may include operating systems and applications. The program instructions 908 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 904, the computer-executable instructions of the program instructions 908 may cause the computing device 900 to implement one or more of the algorithms and/or methodologies disclosed herein. The non-volatile storage 906 may also include data 910 supporting the functions, features, and processes of the one or more embodiments described herein. This data 910 may include, as some examples, the images or video frames, luminance or color channels of the images or video frames, the signal activity computed from the channels, significance thresholds that are compared to the signal activity, the determined banding pixels, and the created banding maps.

The methods and systems of banding assessment in the present disclosure may be applied in many image and video processing and communication applications. An example application field is video distribution networks such as cable, satellite, IPTV, Internet, and content delivery networks (CDNs), where it may be deployed in a video distribution chain at a single monitoring point in a single-ended NR manner. It may also be applied in the video distribution chain at two monitoring points in a double-ended FR manner (for example, before and after a video transcoder). The present disclosure applies to both SDR and HDR content of any bit-depth, any color format, any color gamut, any color downsampling or YCC format, any OETF/ EOTF for cameras and displays. With the growing popularity of HDR video content, distribution and display devices, banding is becoming more visible and visually annoying. The present disclosure is well-matched with the application of HDR content distribution and is applicable to all types of HDR formats including HLG, HDR10, HDR10+ and Dolby Vision. It may be used in quality control applications, where banding is detected, assessed, localized, and repaired. It may also be used in quality optimization applications, for example, in the design and fine-tuning of SDR/HDR video delivery systems, encoders, encoder selections, pre-processing and post-processing methods, and adaptive streaming strategies.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing banding effects in an image or video, comprising:
    decomposing the image or each frame of the video into luminance or color channels;
    computing signal activity at each spatial location in each channel;
    determining a significance of the signal activity at each spatial location by comparing each element of the signal activity with a significance threshold;
    detecting banding pixels as those pixels of the image or frame having significant signal activity at their respective spatial locations and having non-significant signal activity of at least a minimum threshold percentage of neighboring pixels to the respective spatial locations; and
    creating a banding map by:
        marking, on the map, the spatial locations of the detected banding pixels;
        normalizing the signal activity at the banding pixel locations using the significance threshold to generate normalized signal activity; and
        determining an intensity level of each of the banding pixels in the banding map as the normalized signal activity of the respective pixel location.

2. The method of claim 1, further comprising measuring the signal activity at a local point or region by:
    defining a local window surrounding the local point or region; and
    computing statistical features for activity or energy estimation within the local window.

3. The method of claim 1, further comprising determining the significance threshold using human visual system just noticeable difference (JND) values.

4. The method of claim 1, further comprising adjusting the significance threshold using maximum and minimum luminance values and luminance steps of a display device configured to present the image or video.

5. The method of claim 1, further comprising adjusting the significance threshold using a bit-depth of the image or video.

6. The method of claim 1, wherein the image or video is encoded in a standard dynamic range (SDR) or high dynamic range (HDR) format, and further comprising adjusting the significance threshold using maximum, minimum, and mean luminance values of the image or video content according to values contained in metadata included in the SDR or HDR format.

7. The method of claim 1, further comprising adjusting the significance threshold using one or more of an optical-electro transfer function (OETF) or an electro-optical transfer function (EOTF) used in one or more of acquisition or display of the image or video.

8. The method of claim 1, further comprising adjusting the significance threshold using one or more of a pixel color value, a color space, a color downsampling format, or a color gamut of the image or video.

9. The method of claim 1, further comprising adjusting the significance threshold using one or more of a viewing distance, a viewing angle, and an ambient light level of a viewing environment of the image or video.

10. The method of claim 1, further comprising trimming the detected banding pixels by:
    comparing the signal activity with a high activity threshold, the high activity threshold being greater than the significance threshold; and
    removing the banding pixels that have higher signal activity than the high activity threshold.

11. The method of claim 1, further comprising:
    computing a banding spread measure by computing a percentage of regions in the image or video frame that contain banding pixels; and
    computing a banding strength measure by computing aggregated signal activities at the banding pixels.

12. The method of claim 11, further comprising computing a per-image or per-frame banding level measure by:
    generating per-color channel banding level by combining banding spread and banding strength measures for each color channel; and
    generating the per-image or per-frame banding level measure by combining per-color channel band level measures from one or more color channels of the image or video frame.

13. The method of claim 12, further comprising, in assessing banding effect in the video, aggregating per-frame banding spread, per-frame banding strength and per-frame banding level measures to banding spread, banding strength and banding level measures at larger time scales including per group-of-picture (per-GoP), per-scene, per video asset, per-second, per-minute, per-hour, and any other time scales.

14. The method of claim 1, further comprising, in assessing the banding effects of the image or video as a test image or video, where a pristine-quality reference image or video is available:
    assessing a banding effect of the reference image or video;
    assessing a banding effect of the test image or video without using the reference image or video; and
    adjusting a banding effect assessment result of the test image or video by discounting a part of the image or video where banding effect is detected in both the reference and test image or video.

15. A system for assessing banding effect in an image or video, comprising:
    a computing device programmed to
        decompose the image or each frame of the video into luminance or color channels;
        compute signal activity at each spatial location in each channel;
        determine a significance of the signal activity at each spatial location by comparing each element of the signal activity with a significance threshold; and
        detect banding pixels as those pixels of the image or frame having significant signal activity at their respective spatial locations and having non-significant signal activity of at least a minimum threshold percentage of neighboring pixels to the respective spatial locations; and
        creating a banding map by performing operations including to:
            mark, on a map, the spatial locations of the detected banding pixels,
            normalize the signal activity at the banding pixel locations using the significance threshold to generate normalized signal activity, and
            determine an intensity level of each of the banding pixels in the banding map as the normalized signal activity of the respective pixel location.

16. The system of claim 15, wherein the computing device is further programmed to measure the signal activity at a local point or region using operations including to:
    define a local window surrounding the local point or region; and
    compute statistical features for activity or energy estimation within the local window.

17. The system of claim 15, wherein the computing device is further programmed to determine the significance threshold using human visual system just noticeable difference (JND) values.

18. The system of claim 15, wherein the computing device is further programmed to adjust the significance threshold using maximum and minimum luminance values and luminance steps of a display device configured to present the image or video.

19. The system of claim 15, wherein the computing device is further programmed to adjust the significance threshold using a bit-depth of the image or video.

20. The system of claim 15, wherein the image or video is encoded in a standard dynamic range (SDR) or high dynamic range (HDR) format, and the computing device is further programmed to adjust the significance threshold using maximum, minimum, and mean luminance values of the image or video content according to values contained in metadata included in the SDR or HDR format.

21. The system of claim 15, wherein the computing device is further programmed to adjust the significance threshold using one or more of an optical-electro transfer function (OETF) or an electro-optical transfer function (EOTF) used in one or more of acquisition or display of the image or video.

22. The system of claim 15, wherein the computing device is further programmed to adjust the significance threshold using one or more of a pixel color value, a color space, a color downsampling format, or a color gamut of the image or video.

23. The system of claim 15, wherein the computing device is further programmed to adjust the significance threshold using one or more of a viewing distance, a viewing angle, and an ambient light level of a viewing environment of the image or video.

24. The system of claim 15, wherein the computing device is further programmed to trim the detected banding pixels by performing operations including to:
   compare the signal activity with a high activity threshold, the high activity threshold being greater than the significance threshold; and
   remove the banding pixels that have higher signal activity than the high activity threshold.

25. The system of claim 15, wherein the computing device is further programmed to:
   compute a banding spread measure by computing a percentage of regions in the image or video frame that contain banding pixels; and
   compute a banding strength measure by computing aggregated signal activities at the banding pixels.

26. The system of claim 25, wherein the computing device is further programmed to compute a per-image or per-frame banding level measure by performing operations including to:
   generate per-color channel banding level by combining banding spread and banding strength measures for each color channel; and
   generate per-image or per-frame banding level measure by combining per-color channel band level measures from one or more color channels of the image or video frame.

27. The system of claim 26, wherein the computing device is further programmed to, in assessing banding effect in a video, aggregate per-frame banding spread, per-frame banding strength and per-frame banding level measures to banding spread, banding strength and banding level measures at larger time scales including per group-of-picture (per-GoP), per-scene, per video asset, per-second, per-minute, per-hour, and any other time scales.

28. The system of claim 15, wherein the computing device is further programmed to, in assessing banding effects of the image or video as a test image or video, where a pristine-quality reference image or video is available:
   assess a banding effect of the reference image or video;
   assess a banding effect of test image or video without using the reference image or video; and
   adjust a banding effect assessment result of the test image or video by discounting a part of the image or video where the banding effect is detected in both the reference and test image or video.

* * * * *